United States Patent
Berionne et al.

(10) Patent No.: US 10,003,959 B2
(45) Date of Patent: Jun. 19, 2018

(54) SUBSCRIBER IDENTITY MODULE (SIM) ACCESS PROFILE (SAP)

(71) Applicant: QUALCOMM Incorporated, San Diego, CA (US)

(72) Inventors: Michele Berionne, San Diego, CA (US); Vivek Shankar, San Diego, CA (US); Karthik Sekuru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/813,891

(22) Filed: Jul. 30, 2015

(65) Prior Publication Data

US 2017/0034691 A1 Feb. 2, 2017

(51) Int. Cl.
*H04W 8/22* (2009.01)
*H04L 29/06* (2006.01)
*H04W 8/20* (2009.01)

(52) U.S. Cl.
CPC ............... *H04W 8/22* (2013.01); *H04L 67/42* (2013.01); *H04W 8/205* (2013.01)

(58) Field of Classification Search
CPC ....... H04W 8/22; H04W 12/06; H04W 8/183; H04W 88/02; H04W 4/12; H04W 4/14;
(Continued)

(56) References Cited

U.S. PATENT DOCUMENTS 5,966,663 A * 10/1999 Gleason .................. H04L 29/06
455/412.1

6,092,133 A * 7/2000 Erola ........................ G06F 3/08
235/380
(Continued)

FOREIGN PATENT DOCUMENTS

EP 1928152 A1 6/2008
EP 2219340 A1 8/2010

OTHER PUBLICATIONS

ETSI TS 102 223: "Smart Cards; Card Application Toolkit (CAT)", Release 9, Technical Specification, European Telecommunications Standards Institute (ETSI), 650, Route Des Lucioles; F-06921 Sophia-Antipolis; France, vol. SCP TEC, No. V9.1.0, Apr. 1, 2010 (Apr. 1, 2010), pp. 1-209, XP014046327.
(Continued)

*Primary Examiner* — Sharad Rampuria
(74) *Attorney, Agent, or Firm* — Muncy, Geissler, Olds & Lowe, P.C./QUALCOMM

(57) ABSTRACT

Systems and methods for the subscriber identity module (SIM) access profile (SAP) over Bluetooth. In one embodiment, intermediate responses from a SIM card containing procedure bytes are not transmitted to the client, but rather the appropriate response is generated by the server and sent to the SIM card. In another embodiment, the client groups together multiple command APDUs (Application Protocol Data Unit) into one message before sending out to the server, and the message may also contain parameters indicating various actions to be taken by the server in case an error is generated. In another embodiment, the client instructs the server to perform poling of the SIM card in an autonomous manner for any proactive data. Embodiments are not limited to a SIM card, and are applicable to other types of smart cards, such as an UICC (Universal Integrated Circuit Card).

41 Claims, 7 Drawing Sheets

(58) Field of Classification Search
CPC ..... H04W 12/02; H04W 12/08; H04W 12/12; H04L 67/42; H04L 12/5895; H04L 63/08; H04B 1/3816; H04M 2250/14; H04M 1/72552
USPC .............................. 455/558, 418–420, 41.2
See application file for complete search history.

(56) References Cited

U.S. PATENT DOCUMENTS

| | | | |
|---|---|---|---|
| 6,557,753 B1* | 5/2003 | Beaujard | G06K 7/065 235/375 |
| 6,676,022 B1 | 1/2004 | Guthery et al. | |
| 8,095,179 B2* | 1/2012 | Haverinen | H04L 63/061 455/556.1 |
| 8,260,353 B2* | 9/2012 | Hugot | H04L 63/0853 455/412.1 |
| 8,768,324 B2 | 7/2014 | Yang et al. | |
| 8,923,827 B2* | 12/2014 | Wentker | G06Q 20/10 455/406 |
| 8,942,672 B2* | 1/2015 | Renard | G06Q 20/3278 455/41.2 |
| 2003/0055735 A1* | 3/2003 | Cameron | G06Q 20/04 705/27.1 |
| 2003/0088691 A1* | 5/2003 | Audebert | G06Q 20/3674 709/237 |
| 2003/0183691 A1* | 10/2003 | Lahteenmaki | G06K 7/0008 235/441 |
| 2004/0042604 A1* | 3/2004 | Hiltunen | H04W 8/205 379/211.05 |
| 2005/0108571 A1* | 5/2005 | Lu | G06F 21/34 726/4 |
| 2005/0279826 A1* | 12/2005 | Merrien | G06Q 20/341 235/380 |
| 2006/0079284 A1* | 4/2006 | Lu | H04W 92/08 455/558 |
| 2006/0092953 A1* | 5/2006 | Haverinen | H04L 63/061 370/400 |
| 2006/0116970 A1* | 6/2006 | Scherzer | G06Q 20/383 705/74 |
| 2006/0293028 A1* | 12/2006 | Gadamsetty | H04L 63/08 455/411 |
| 2007/0197163 A1* | 8/2007 | Robertson | H04L 63/105 455/26.1 |
| 2008/0109656 A1* | 5/2008 | Kotzin | G06F 21/6218 713/165 |
| 2008/0167074 A1* | 7/2008 | Van Steenbergen | H04W 88/06 455/558 |
| 2008/0285755 A1* | 11/2008 | Camus | H04L 9/3247 380/270 |
| 2010/0069039 A1* | 3/2010 | Kawamura | G06K 19/07732 455/410 |
| 2010/0070649 A1* | 3/2010 | Ng | H04L 67/02 709/236 |
| 2010/0105433 A1* | 4/2010 | Lin | H04B 1/3816 455/558 |
| 2010/0311467 A1* | 12/2010 | Wu | H04W 8/205 455/558 |
| 2012/0108294 A1* | 5/2012 | Kaul | G06K 7/0013 455/558 |
| 2012/0172016 A1* | 7/2012 | Veneroso | H04W 12/06 455/414.1 |
| 2014/0106727 A1 | 4/2014 | Velusamy et al. | |
| 2014/0119407 A1 | 5/2014 | Miller | |
| 2014/0165170 A1 | 6/2014 | Dmitriev et al. | |
| 2014/0379779 A1 | 12/2014 | Ewe | |
| 2015/0189496 A1 | 7/2015 | Park et al. | |

OTHER PUBLICATIONS

International Search Report and Written Opinion—PCT/US2016/034585—ISA/EPO—dated Nov. 17, 2016.
N B: "Sim Access Profile, Interoperability Specification V11r00", Dec. 18, 2008 (Dec. 10, 2008), 52 Pages, XP055118185, Retrieved from the Internet: URL: https://www.bluetooth.org/docman/handlers/DownloadDoc.ashx?doc_id=158740 [retrieved on May 15, 2014].

* cited by examiner

SUBSCRIBER IDENTITY MODULE (SIM) ACCESS PROFILE (SAP)

FIELD OF DISCLOSURE

Embodiments pertain to communication between a client and a server for a SIM (Subscriber Identity Module) card, and more particularly to the SIM Access Profile protocol over Bluetooth.

BACKGROUND

The SIM (Subscriber Identity Module) Access Profile, SAP, is a protocol over Bluetooth® that allows a terminal, acting as a client, to access a SIM card in another device, acting as a server. (Bluetooth is a registered trademark of Bluetooth SIG, a Delaware corporation with headquarters in Lake Washington Boulevard, Suite 350, Kirkland, Wash.) As an example, a terminal may be a vehicle hands-free kit, sometimes simply referred to as a car kit, and a server may be a driver's cellphone so that the driver may make hand-free calls. Further examples include a cellphone or tablet acting as a client that accesses a remote SIM card in a dongle or other portable device. The portable device may be a wearable device, such as a wristwatch.

At various times, such as for example during an initial network registration procedure, the client needs to access various data stored in the SIM card. To obtain the desired data, the client streams messages containing APDUs (Application Protocol Data Unit) to the server (e.g., driver's cellphone) to request the desired data, and the server responds with messages containing APDUs with the requested data. It is desirable to speed this process up so as to reduce delays, and to reduce power consumption in portable Bluetooth capable devices.

SUMMARY

Embodiments of the invention are directed to systems and methods for improvements of the Subscriber Identity Module (SIM) Access Profile, SAP.

In one embodiment, a method comprises: sending a first message by a client to a server, the first message comprising a first APDU (Application Protocol Data Unit) to request data from an integrated circuit card on the server, the data having a length; receiving at the server a first response from the integrated circuit card indicating a procedure and the length of the data, the procedure comprising sending a second APDU to request the data, the second APDU comprising a parameter indicating the data length; generating, by the server, the second APDU and sending the second APDU to the integrated circuit card to obtain the data; receiving at the server a second response from the integrated circuit card comprising the data; and sending, by the server, a second message to the client comprising the data.

In another embodiment, a method comprises: sending by a client to a server a first message comprising a plurality of command APDUs (Application Protocol Data Units) for processing by an integrated circuit card on the server, the first message indicating an order of processing for the command APDUs; storing at the server the plurality of command APDUs in a memory; sending by the server to the integrated circuit card a first command APDU in the plurality of command APDUs, the first command APDU to be processed first according to the order of processing; receiving at the server from the integrated circuit card a first response APDU in response to the first command APDU; and sending by the server to the client a second message indicating the first response APDU.

In another embodiment, a method comprises: sending by client to a server a first message, the server comprising an integrated circuit card, the first message indicating the server to perform autonomous polling of an integrated circuit card; polling by the server the integrated circuit card; in response to the polling by the server, the integrated circuit card sending a command APDU (Application Protocol Data Unit) comprising proactive data; and sending by the server to the client a second message comprising the proactive data.

In another embodiment, a system comprises: an integrated circuit card storing data; and a server in communication with the integrated circuit card, the server configured to receive a first message from a client, the first message comprising a first APDU (Application Protocol Data Unit) to request data from the integrated circuit card, the data having a length; the server further configured to receive a first response from the integrated circuit card indicating a procedure and the length of the data, the procedure indicating a second APDU to request the data, the second APDU comprising a parameter indicating the data length, wherein the server generates the second APDU and sends the second APDU to the integrated circuit card to obtain the data; and the server further configured to receive a second response from the integrated circuit card comprising the data, wherein the server sends a second message to the client comprising the data.

In another embodiment, a system comprises: an integrated circuit card to process APDUs (Application Protocol Data Units); and a server comprising a memory and in communication with the integrated circuit card; the server configured to receive from a client a first message comprising a plurality of command APDUs for processing by the integrated circuit card, the first message indicating an order of processing for the command APDUs, where the server stores the plurality of command APDUs in the memory; the server further configured to send to the integrated circuit card a first command APDU in the plurality of command APDUs, the first command APDU to be processed first according to the order of processing; and the server further configured to receive from the integrated circuit card a first response APDU in response to the first command APDU, where the server sends to the client a second message indicating the first response APDU.

In another embodiment, a system comprises: an integrated circuit card; and a server in communication with the integrated circuit card; the server configured to receive from a client a first message, the first message indicating the server to perform autonomous polling of the integrated circuit card, where in response to receiving the first message the server polls the integrated circuit card; and in response to the polling by the server, the integrated circuit card sends to the server a command APDU (Application Protocol Data Unit) comprising proactive data, wherein the server sends to the client a second message comprising the proactive data.

In another embodiment, a system comprises: means for sending a first message by a client to a server, the first message comprising a first APDU (Application Protocol Data Unit) to request data from an integrated circuit card on the server, the data having a length; means for receiving at the server a first response from the integrated circuit card indicating a procedure and the length of the data, the procedure comprising sending a second APDU to request the data, the second APDU comprising a parameter indicating the data length; means for generating, by the server, the second APDU and sending the second APDU to the integrated circuit card to obtain the data; means for receiving at the server a second response from the integrated circuit card comprising the data; and means for sending, by the server, a second message to the client comprising the data.

In another embodiment, a system comprises: means for sending by a client to a server a first message comprising a plurality of command APDUs (Application Protocol Data Units) for processing by an integrated circuit card on the server, the first message indicating an order of processing for the command APDUs; means for storing at the server the plurality of command APDUs in a memory; means for sending by the server to the integrated circuit card a first command APDU in the plurality of command APDUs, the first command APDU to be processed first according to the order of processing; means for receiving at the server from the integrated circuit card a first response APDU in response to the first command APDU; and means for sending by the server to the client a second message indicating the first response APDU.

In another embodiment, a system comprises: means for sending by client to a server a first message, the server comprising an integrated circuit card, the first message indicating the server to perform autonomous polling of an integrated circuit card; means for polling by the server the integrated circuit card; in response to the polling by the server, the integrated circuit card sending a command APDU (Application Protocol Data Unit) comprising proactive data; and means for sending by the server to the client a second message comprising the proactive data.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
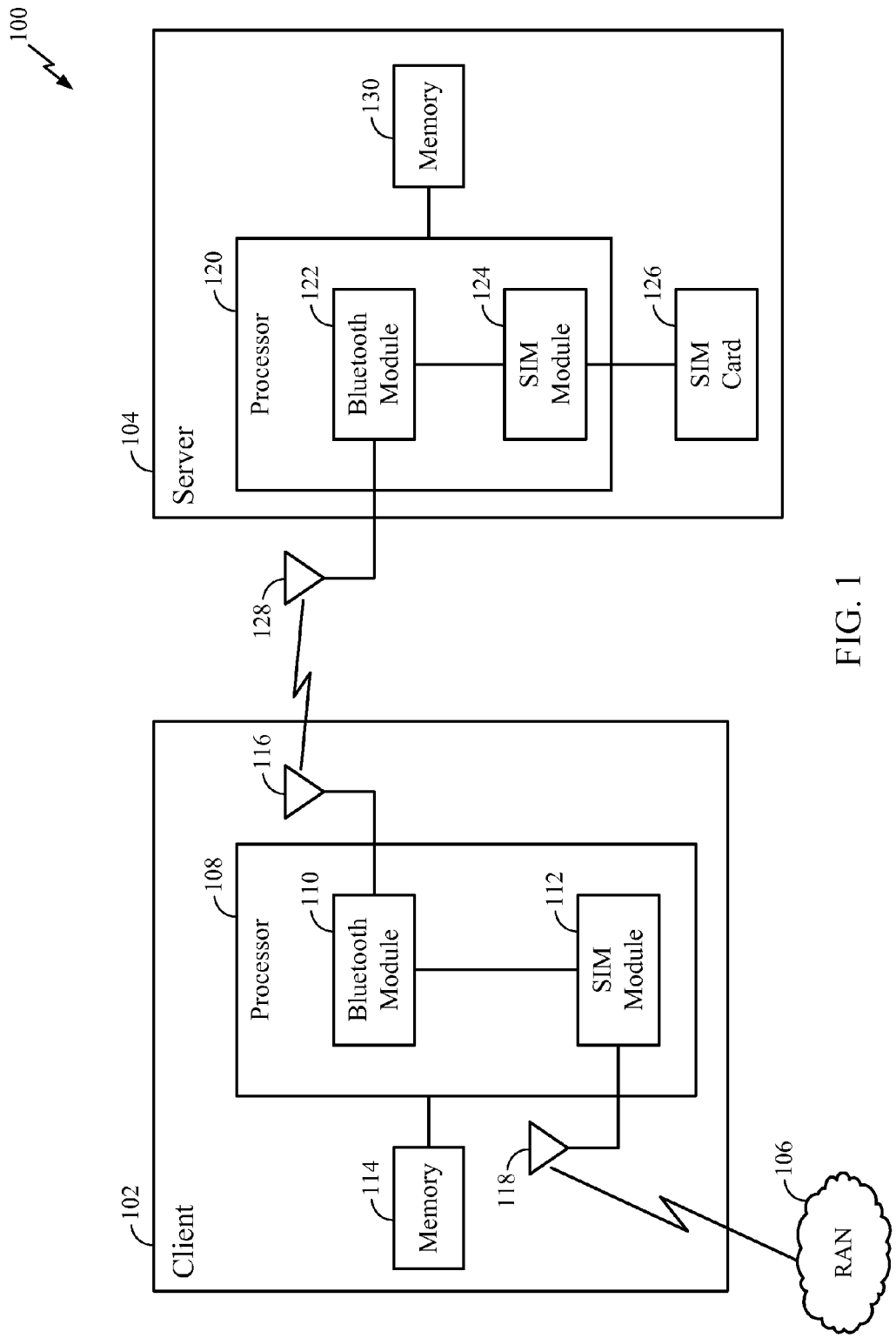
FIG. 1 is a system diagram in which embodiments may find application.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The embodiments described herein are not limited to systems with SIM cards, but may find application in systems with other types of integrated circuit cards used to store personal or network information, where APDUs are utilized as the communication units with the integrated circuit cards. An example of such an integrated circuit card is the UICC (Universal Integrated Circuit Card) used in UMTS (Universal Mobile Telecommunications System) for storing network and personal subscriber information.

More generally, such integrated circuit cards may be referred to as smart cards. A smart card may also be used with POS (Point of Sale) systems in which sensitive information for authentication is obtained from a credit card. The standard ISO/IEC 7816-4 provides examples of APDUs used to communicate with smart cards. Some of the personal information stored in a smart card may be sensitive, such as for example a PIN (Personal Identification Number) or a security key used to identify the owner of the smart card and to encrypt messages sent wirelessly by the device in which the smart card is embedded.

Accordingly, in the following description of the embodiments, the term "integrated circuit card" may be used instead of specific terms such as "SIM card" or "UICC," it being understood that a SIM card and an UICC are particular examples of an integrated circuit card.

Embodiments may be realized by various modules as abstracted in the system diagram of FIG. 1. The system 100 includes the client 102, the server 104, and the radio access network (RAN) 106. The client 102 may be a car kit, a laptop, or a cell phone, to name just a few examples. The client 102 may have its own integrated circuit card having subscriber and network information to provide communication with the RAN 106, but for the particular embodiment illustrated in FIG. 1 the client 102 is shown without such an integrated circuit card. Processes to be described later may be implemented by various modules within the client 102 and the server 104.

The client 102 is illustrated as having the processor 108 and two modules: the Bluetooth module 110 and the SIM module 112. In practice, there may be more than one processor where some or all of the processes performed by the Bluetooth module 110 or the SIM module 112 may be performed by one or more programmable processors and special purpose integrated circuits. For example, the Bluetooth module 110 is a simplified abstraction of the Bluetooth protocol stack, where software processes running on a programmable processor may provide the host layer of the Bluetooth stack, and the layers below the host layer (the controller layer) may be realized by one or more ASICs.

Likewise, various modules and processes running on one or more programmable processors and special purpose integrated circuits may perform the functions of the SIM module 112. For example, the SIM module 112 may comprise software running on the same programmable processor as the host layer of the Bluetooth module, and may also include a module running on a baseband processor. However, for ease of illustration only one processor is explicitly illustrated in FIG. 1, it being understood that the processor 108 in FIG. 1 is representative of one or more programmable processors and one or more special purpose integrated circuits.

FIG. 1 also illustrates the client 102 having the memory 114, the Bluetooth antenna 116 for communicating with the server 104, and the antenna 118 for communicating with the RAN 106. The memory 114 may be considered a non-transitory computer readable medium having software instructions that when executed on one or more processors perform all or some of the processes indicated by the Bluetooth module 110 and the SIM module 112.

The server 104 includes the processor 120, the Bluetooth module 122, the SIM module 124, and the SIM card 126. As discussed with respect to the client 102, the processor 120 serves as a simplified representation of one or more programmable processors and one or more special purpose integrated circuits performing some or all of the processes represented by the Bluetooth module 122 and the SIM module 124. The server 104 includes the Bluetooth antenna 128 for communicating with the client 102 over a Bluetooth link. The server 104 may be a wearable device such as a wristwatch, laptop, a cell phone, or any other device capable of accepting a SIM card.

It should be appreciated that embodiments represented by FIG. 1 are not limited to those involving a SIM card and its related modules for communicating with the SIM card, so that the embodiments may pertain to other integrated circuit cards such as a smart card or an UICC. However, for ease of illustration, FIG. 1 includes the SIM card 126, where the client 102 has remote access to information stored on the SIM card 126 over a Bluetooth link. The processes by which the client 102 accesses data stored on the SIM card 126 in the server 104 are transparent to the RAN 106, so that from the point of view of the RAN 106 the client 102 appears as a terminal having its own SIM card.

FIG. 1 also illustrates the server 104 comprising the memory 130, which may be considered a non-transitory computer readable medium having software instructions that when executed on one or more processors or one or more special purpose integrated circuits perform all or some of the processes indicated by the Bluetooth module 122 and the SIM module 124.

Various command and response APDU pairs for communicating with an integrated circuit card are described in the technical specification ISO/IEC 7816-4 (International Organization for Standardization/International Electrotechnical Commission). As described in that specification, a response APDU (R-APDU) in response to a command APDU (C-APDU) includes fields for two status words: SW1 and SW2. The value of a status word may be set to a procedure byte. A procedure byte indicates to the sender of the C-APDU what shall be its next action. Procedure bytes are not transmitted to the application layer of the sender, but are used to continue communication with the integrated circuit card.

For example, in a conventional implementation of the SAP protocol with a client and server over Bluetooth, where the server includes a 3G UICC as specified in the technical specification ETSI TS 102 221, ETSI (European Telecommunications Standards Institute) Technical Committee Smart Card Platform (SCP), a R-APDU from the UICC may have the status word SW1 set to the procedure byte '61'. (The convention is followed where 'XX' denotes a byte where each X is a hexadecimal value.) In this case, the client shall immediately send the C-APDU, GET RESPONSE, to the server with length field Le set to the value of SW2 (the value of SW2 indicating the length of data still available from the server). As another example, the server may abort a received command by setting the value of SW1 to the procedure byte '6C', in which case the client shall immediately repeat the previous C-APDU to the server with length field Le set to the value of SW2 (the exact length of the requested data). For a 2G GSM SIM card as specified in the technical specification 3GPP TS 51011 (3rd Generation Partnership Project), the server sets the value of SW1 to the procedure byte '9F' instead of '61' as discussed above.

In a conventional implementation of the SAP protocol, it is common for the client to send a C-APDU request to request needed data, and then to receive from the server a R-APDU having a procedure byte indicating an action from the client requiring that it send the C-APDU GET RESPONSE. For example, during initialization of a SIM card, the client may over multiple times retrieve the FCP (File Control Parameters) template of various files on the SIM card using the C-APDU SELECT REQUEST. This back and forth transfer of messages between client and server contributes to latency and power consumption.

Figure 2:
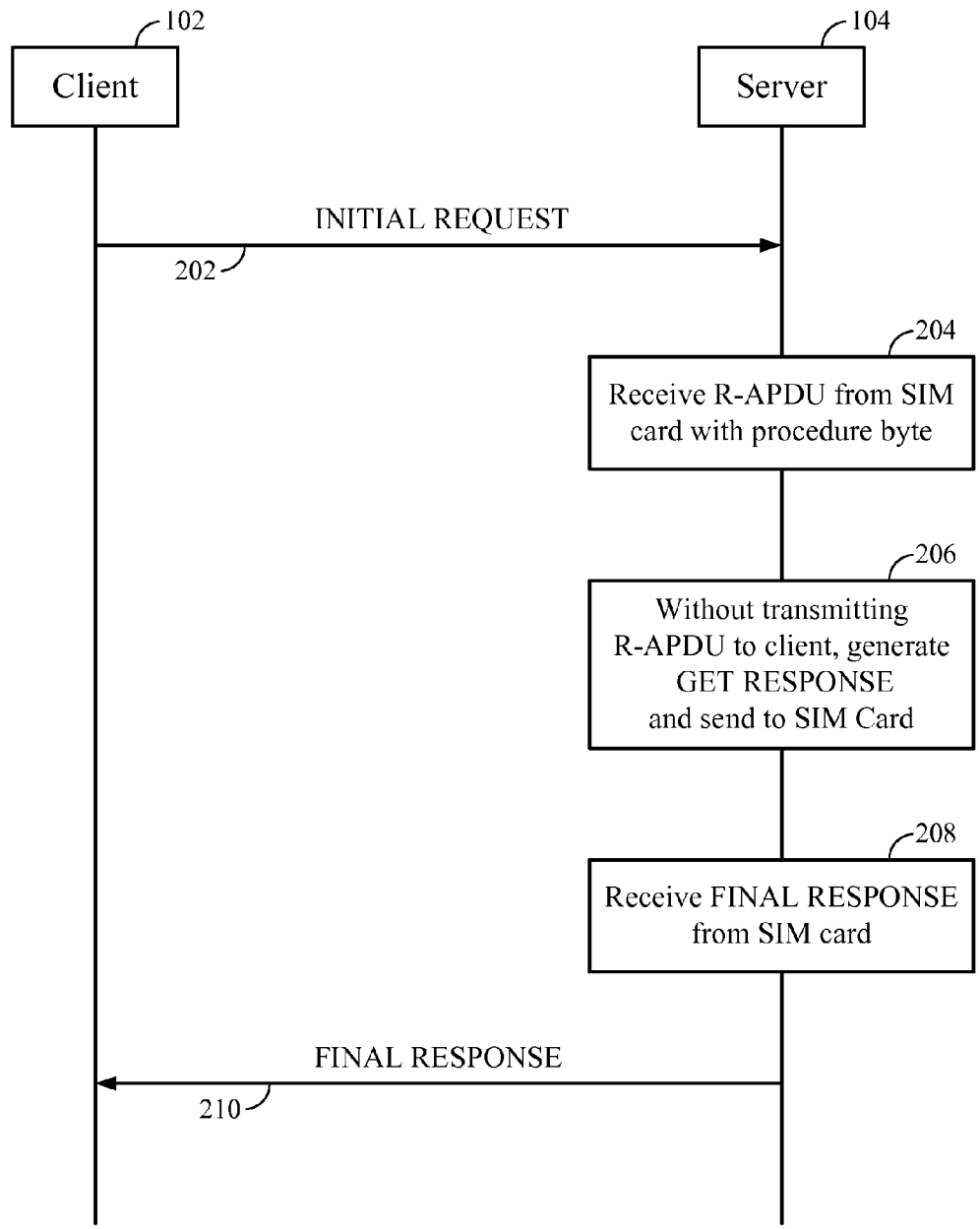
FIG. 2 is a signaling diagram for a client and server according to an embodiment where intermediate response are not transmitted to the client.

FIG. 2 is a signaling diagram illustrating embodiments to improve upon the above-described conventional SAP protocol. The client 102 transmits a C-APDU to initiate a request, denoted in FIG. 2 as INITIAL REQUEST and labeled 202. In FIG. 2, INITIAL REQUEST merely represents a generic C-APDU used to begin a request by the client 102 for data stored on the server 104. For example, the client in the action 202 may transmit SELECT REQUEST. The server 104 receives this C-APDU, and the SIM module 124 sends it to the SIM card 126. In response to INITIAL REQUEST, for the particular example of FIG. 2, the SIM card 126 sends to the SIM module 124 a R-APDU having a status word set to a procedure byte that requires further action, as indicated in the action 204.

In the action 206, the R-APDU from the SIM card 126 is not transmitted to the client 102. Furthermore, the SIM module 124 (or more generally, the server 104) generates the appropriate C-APDU, which in this case is GET RESPONSE, and sends it to the SIM card 126. The SIM card 126 sends to the SIM module 124 a R-APDU in response to the received GET RESPONSE, indicated as FINAL RESPONSE in the action 208. The FINAL RESPONSE includes the data originally requested by the client 102. The server 104 transmits FINAL RESPONSE to the client 102, where this action is denoted in FIG. 2 as 210. In this way, embodiments reduce message traffic between a client and server, thereby reducing latency and consumed power.

Other embodiments may reduce messaging time between a client and server by allowing multiple C-APDUs to be grouped together and included in a single message. When a server receives this message, the C-APDUs are stored in a queue, which may be stored as a FIFO (First-In-First-Out) buffer in the memory 130 of the server 104, to be processed in order as listed in the message. In addition to parameters in the message used to identify the particular C-APDUs, one or more parameters may be included in the message to indicate what action the server 104 should take if there is a failure or error when processing one or more of the C-APDUs.

Figure 3:
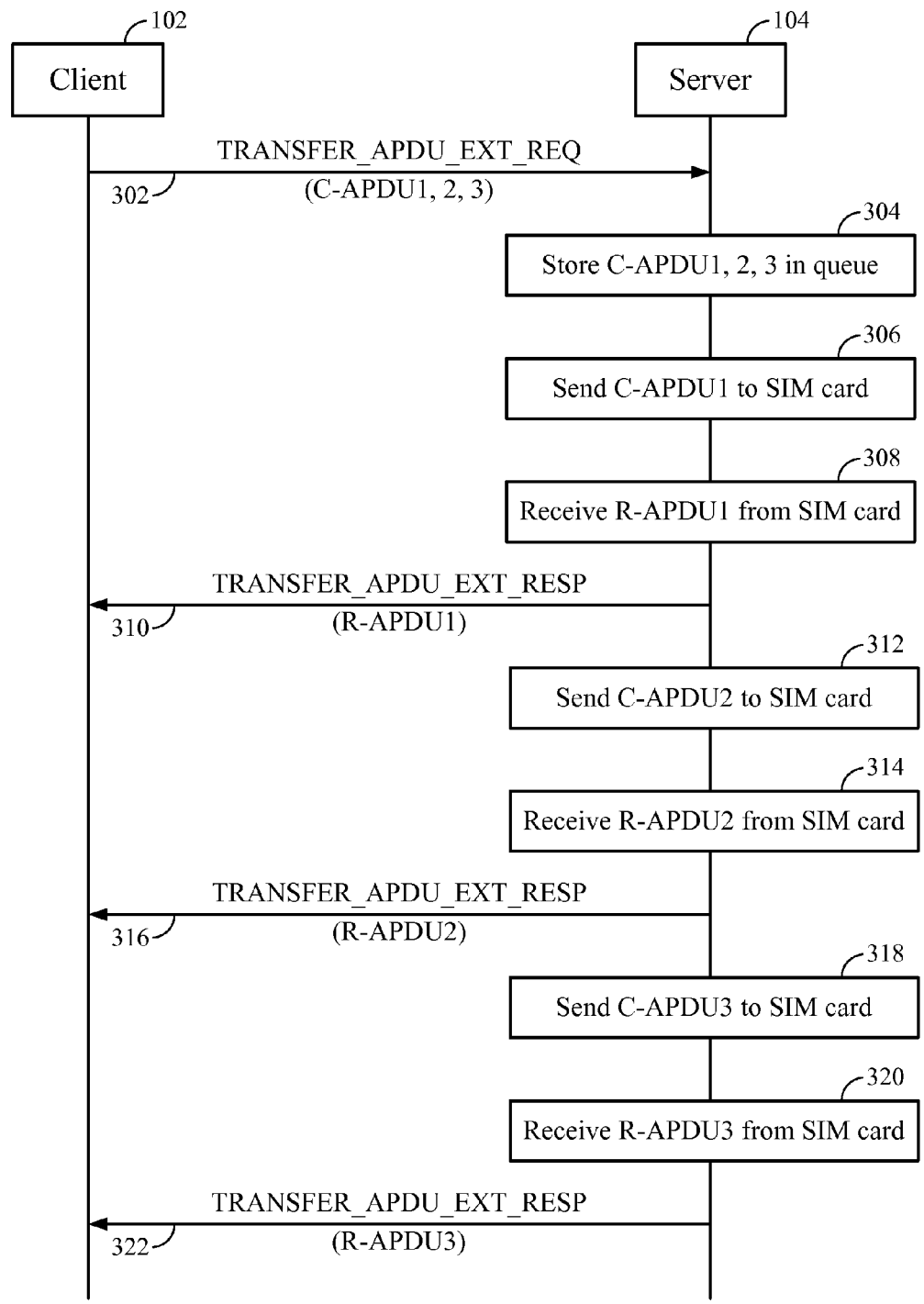
FIG. 3 is a signaling diagram for a client and server according to an embodiment in which multiple application protocol data units are grouped into one message.

FIG. 3 is a signaling diagram illustrating other embodiments that employ parallelism at the system level so as to reduce messaging time between a client and server. In the particular example of FIG. 3, it assumed that all included C-APDUs in a message are completed without error. The cases for when an error occurs are described later.

The message sent by the client 102 is denoted in FIG. 3 as TRANSFER_APDU_EXT_REQ. In the particular example of FIG. 3, three C-APDU's are included in the message: C-APDU1, C-APDU2, and C-APDU3. The value of the integer label "N" in "C-APDUN" denotes the order in which that C-APDU shall be processed. Clearly, embodiments may include various combinations of C-APDUs, greater or lesser in number than 3, the particular example represented in FIG. 3. The label 302 denotes the action of the client 102 sending to the server 104 the message TRANSFER_APDU_EXT_REQ containing the three C-APDUs: C-APDU1, C-APDU2, and C-APDU3.

In the action 304, the server 104 stores the three C-APDUs in a queue, and in the action 306, the first C-APDU, namely C-APDU1, is sent to the SIM card 126. In the action 308, the SIM module 124 (more generally, the server 104) receives the R-APDU in response to C-APDU1 from the SIM card 126, denoted in FIG. 3 as R-APDU1. The R-APDU1 is included in a message, denoted as TRANSFER_APDU_EXT_RESP, and sent to the client 102, as indicated the action 310.

In the action 312, the SIM module 124 sends C-APDU2 to the SIM card 126, and receives the R-APDU from the SIM card 126, indicated as R-APDU2 in the action 314. Note that while the client 102 is processing the message TRANSFER_APDU_EXT_RESP sent earlier in the action 310, the server 104 is working on the second of the C-APDUS, namely C-APDU2. In this way, although the SIM card 126 does not process more than one C-APDU at a time, nevertheless a type of parallelism is achieved by the system as a whole. The R-APDU2 is included in another message, TRANSFER_APDU_EXT_RESP, and transmitted to the client 102, as indicated in the action 316.

In the action 318, the SIM module 124 sends C-APDU3 to the SIM card 126, and receives the R-APDU from the SIM card 126, indicated as R-APDU3 in the action 320. The R-APDU2 is included in another message, TRANSFER_APDU_EXT_RESP, and transmitted to the client 102, as indicated in the action 322.

Note from the timeline indicated in FIG. 3 that the action 312 occurs after the action 310. However, this is not a requirement and is merely shown this way for ease of illustration. For some embodiments, the C-APDU2 may be sent to the SIM card 126 before or during the action 310.

Similar remarks apply to the other action for C-APDU3. The server 104 may also receive new requests before the action 322 is completed. In this way, the queue in the server 104 need not become empty so as to optimize performance.

For some embodiments, the message TRANSFER_APDU_EXT_REQ includes parameters, one for each C-APDU included in the message, for instructing the server 104 what to do in case there is an error when attempting to process that C-APDU. Such parameters may be included in a header for the message TRANSFER_APDU_EXT_REQ.

Figure 4:
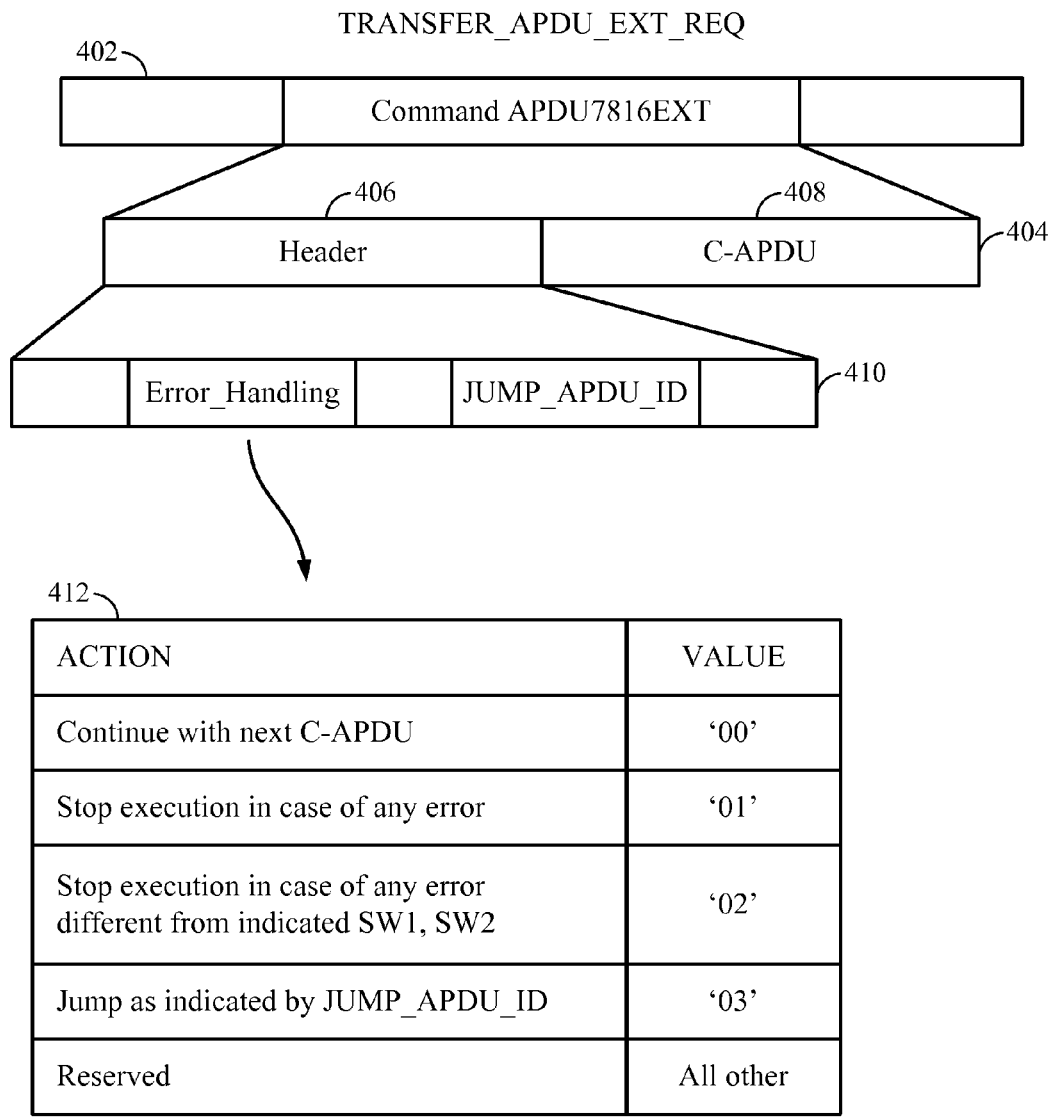
FIG. 4 illustrates actions taken by a client and server in case of an error when processing multiple application protocol data units.

For example, FIG. 4 shows the message TRANSFER_APDU_EXT_REQ, labeled 402, that includes a parameter referred to as CommandAPDU7816EXT. There is one such parameter for each C-APDU included in the message TRANSFER_APDU_EXT_REQ. The parameter CommandAPDU7816 is expanded by label 404, and is shown to include a header, labeled 406, and its associated C-APDU, labeled 408. The header 406 is expanded by label 410, and is shown to include an error handling parameter, referred to as Error_Handling, and another parameter referred to as JUMP_APDU_ID. The value of the error handling parameter Error_Handling indicates what action is to be done if there is an error. If the value of Error_Handling indicates a jump in the order of processing the C-APDUs, then the parameter JUMP_APDU_ID is used to determine the jump. The value of the parameter JUMP_APDU_ID is the APDU ID specifying the C-APDU that the order of processing is to jump to. Examples are illustrated in the table labeled 412.

Referring to the table 412, if the value of the error handling parameter is '00', then if an error occurs when trying to process the current C-APDU, then the next in order C-APDU is sent to the SIM card 126. If the value of the error handling parameter is '01', then execution of all the C-APDUs inside the message 402 is aborted. If the value of the error handling parameter is '02', then execution is stopped in case the error is different from that indicated by the status words SW1 and SW2. If the value of the error handling parameter is '03', then there is a jump in the order in which the C-APDUs are processed by the SIM card 126, where the jump is indicated by the value of JUMP_APDU_ID. Other values for the error handling parameter may be reserved for further use.

It is to be appreciated that the particular actions and corresponding values indicated in the table 412 are provided merely to serve as an example of how execution of the C-APDUs are performed when there is an error. Other embodiments may utilize a different set of actions or a different set of values.

Figure 5:
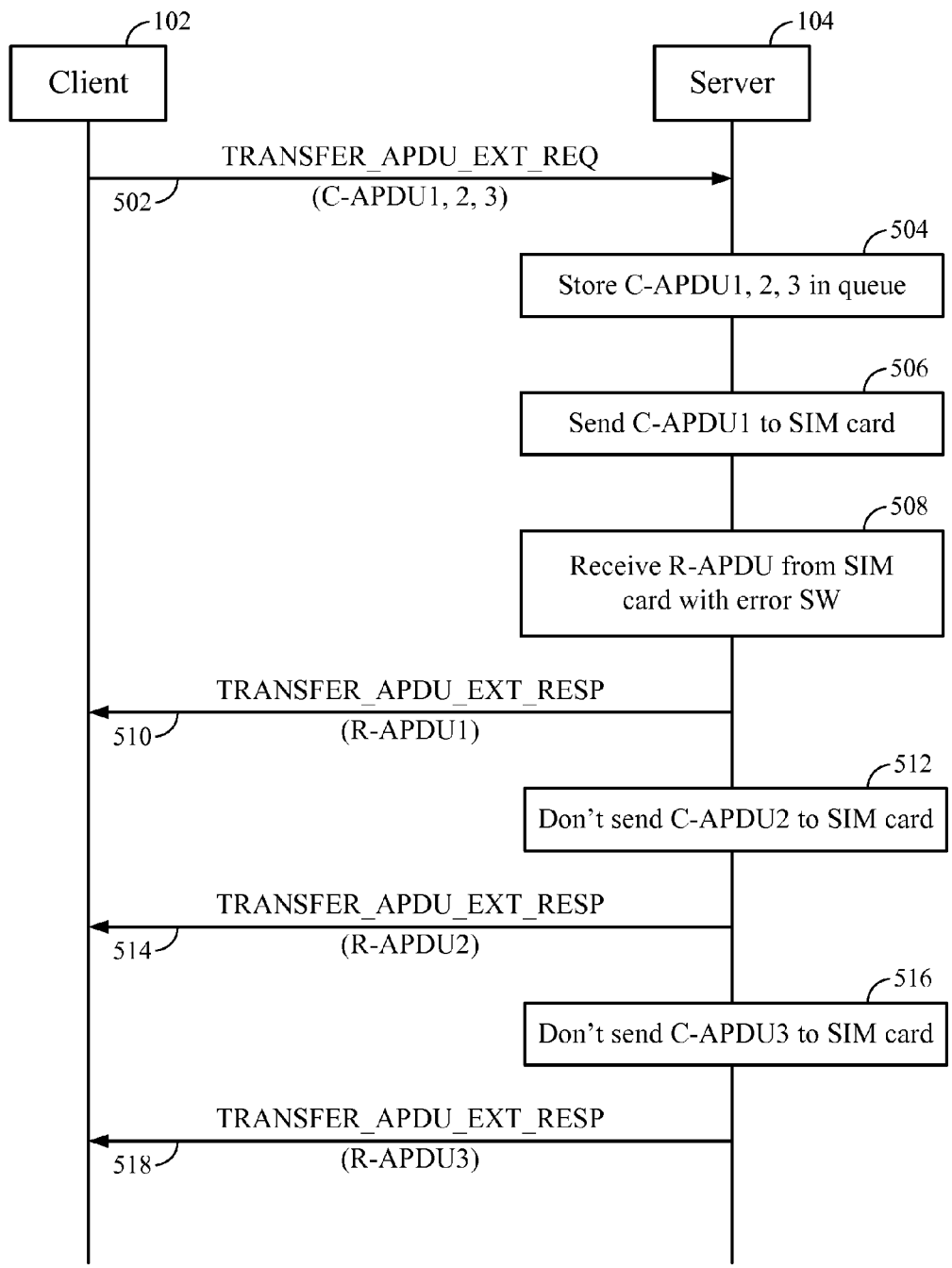
FIG. 5 is a signaling diagram for a client and server according to an embodiment where processing multiple application protocol data units stop upon an error.

FIG. 5 is a signaling diagram for an embodiment in which an error occurs, and for which the error handling parameter indicates that execution is to stop in case of any error, which for the particular embodiment illustrated by the table 412 is the case for which the error handling parameter has the value '01'. In the action 502, the client 102 sends to the server 104 the message TRANSFER_APDU_EXT_REQ containing the three C-APDUs: C-APDU1, C-APDU2, and C-APDU3; and in the action 504, the SIM module 124 (more generally, the server 104) stores the three C-APDUs in a queue. This queue may be a FIFO buffer in the memory 130. In the action 506, the server sends the C-APDU1 to the SIM card 126. These three actions are similar to that described with respect to FIG. 3. However, in the action labeled 508, an error occurs when the SIM card 126 tries to execute C-APDU1, and the SIM card 126 sends back to the server 104 (e.g., the SIM module 124) a R-APDU with a status word indicating an error, referred to as R-APDU1.

In the action 510, the server 104 sends to the client 102 the message TRANSFER_APDU_EXT_RESP that includes the R-APDU1 so that the client 102 knows what kind of error may have occurred. Because the error handling parameter has the value '01', none of the remaining C-APDUs in the queue are to be executed. Accordingly, action 512 indicates that the C-APDU2 is not sent to the SIM card 126, in which case in action 514 the message TRANSFER_APDU_EXT_RESP is sent to the client 102 with one or more parameters set to indicate that there has been an error and the C-APDU (presently C-APDU2) is aborted (not executed). Similarly, the action 516 indicates that C-APDU3 is not sent to the SIM card 126, in which case in action 518 the message TRANSFER_APDU_EXT_RESP is sent to the client 102 with one or more parameters set to indicate that there is an error and the C-APDU (presently C-APDU3) is aborted (not executed).

Figure 6:
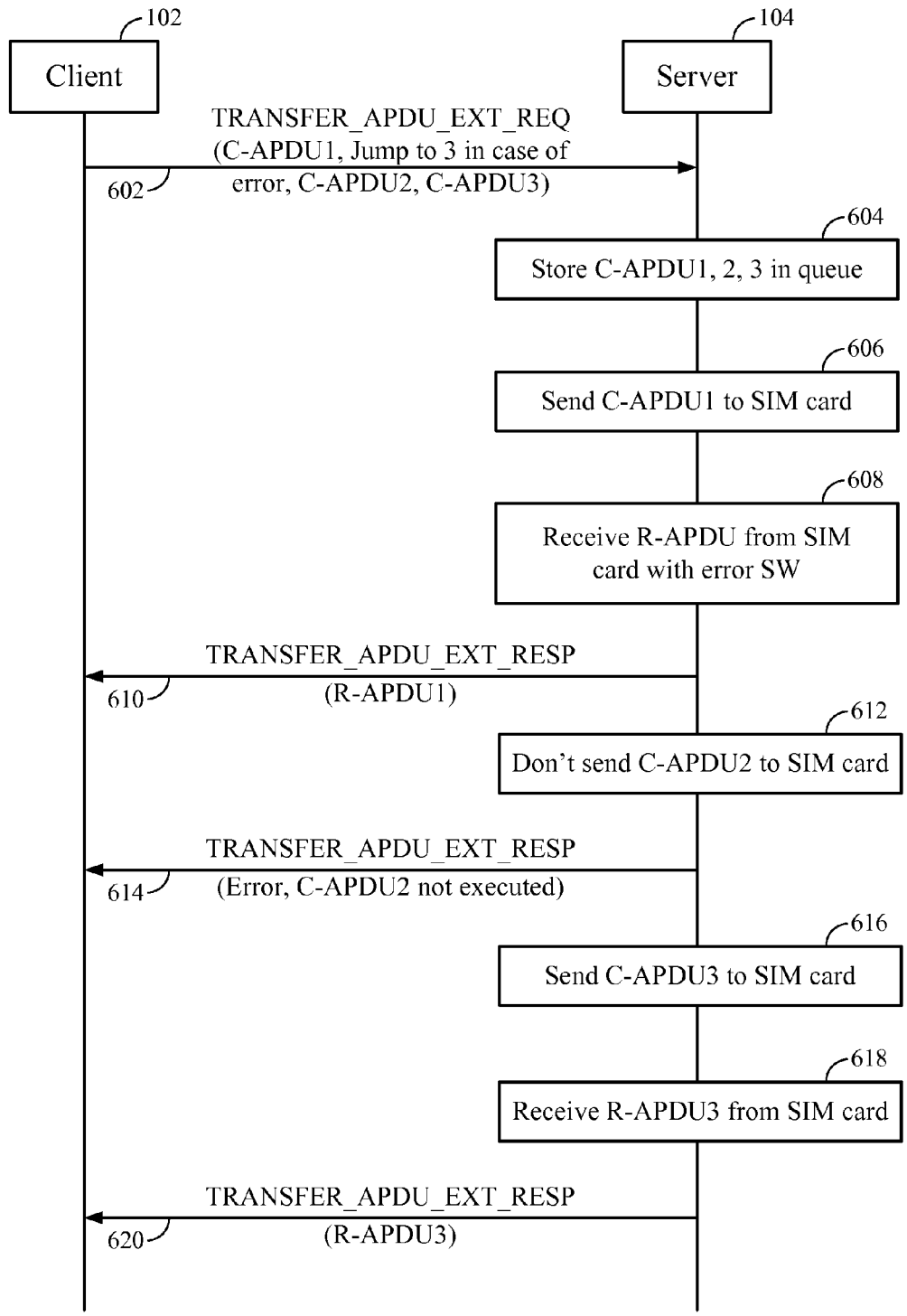
FIG. 6 is a signaling diagram for a client and server according to an embodiment where there is a jump in order when processing multiple application protocol data units upon an error.

FIG. 6 is a signaling diagram for in embodiment in which an error occurs, and for which the error handling parameter indicates that execution is to jump, as indicated in the table 412 when the error handling parameter has the value '03'. In the action 602, the client 102 sends to the server the message TRANSFER_APDU_EXT_REQ containing the three C-APDUs: C-APDU1, C-APDU2, and C-APDU3; and in the action 604, the SIM module 124 (more generally, the server 104) stores the three C-APDUs in a queue, e.g., a FIFO buffer in the memory 130. In the action 606, the server 104 sends the C-APDU1 to the SIM card 126. These three actions are similar to that described previously, and in the action labeled 608 an error occurs when the SIM card 126 tries to execute C-APDU1, so that the SIM card 126 sends back to the server 104 a R-APDU with a status word indicating an error, again referred to as R-APDU1.

In the action 610, the server 104 sends to the client 102 the message TRANSFER_APDU_EXT_RESP that includes the R-APDU1 so that the client 102 knows what kind of error may have occurred. Because the error handling parameter has the value '03', a jump in execution order occurs. For the particular example illustrated in FIG. 6, the value of JUMP_APDU_ID is set to indicate that the jump is to be made to C-APDU3. Accordingly, in the action 612, C-APDU2 is not sent to the SIM card 126, and in the action 614 the message TRANSFER_APDU_EXT_RESP is sent to the client 102 with one or more parameters set to indicate that there has been an error and the C-APDU (presently C-APDU2) is aborted (not executed). However, unlike FIG. 5, in the action 616, C-APDU3 is sent to the SIM card 126. In the action 618, the SIM card 126 sends R-APDU3 to the SIM Module 124 (more generally, the server 104), and in action 620 the message TRANSFER_APDU_EXT_RESP is sent to the client 102 with R-APDU3.

For some systems, after an initial sequence where the number of APDUs exchanged among a client and server is relatively high, often the interaction between the client and server is limited to only polling for some period of time. Normally, there are two separate polling procedures done by a terminal to a SIM card: proactive polling, which is negotiated with the SIM card, to retrieve any pending proactive commands from the SIM card; and card detection polling, required by some applications on the SIM card, for example the USIM (Universal Subscriber Identity Module) as specified in 3GPP TS 31.102.

The default polling interval is 30 seconds, but this might vary, depending on the status of the call and the negotiation done with a proactive SIM card. The frequency of the polling, the parameters used during the polling, and the exact response are in general known only to the client, which has ability to decode and execute proactive commands and knows the status of voice and data calls. Some embodiments allow the client to instruct the server so that the server autonomously performs the polling procedures, independently of the client, and the server notifies the client only when required (for example, in case of error or in case of available proactive command from the SIM card). In this way, unnecessary messages are not sent over the Bluetooth link, leading to a saving in power consumption.

Figure 7:
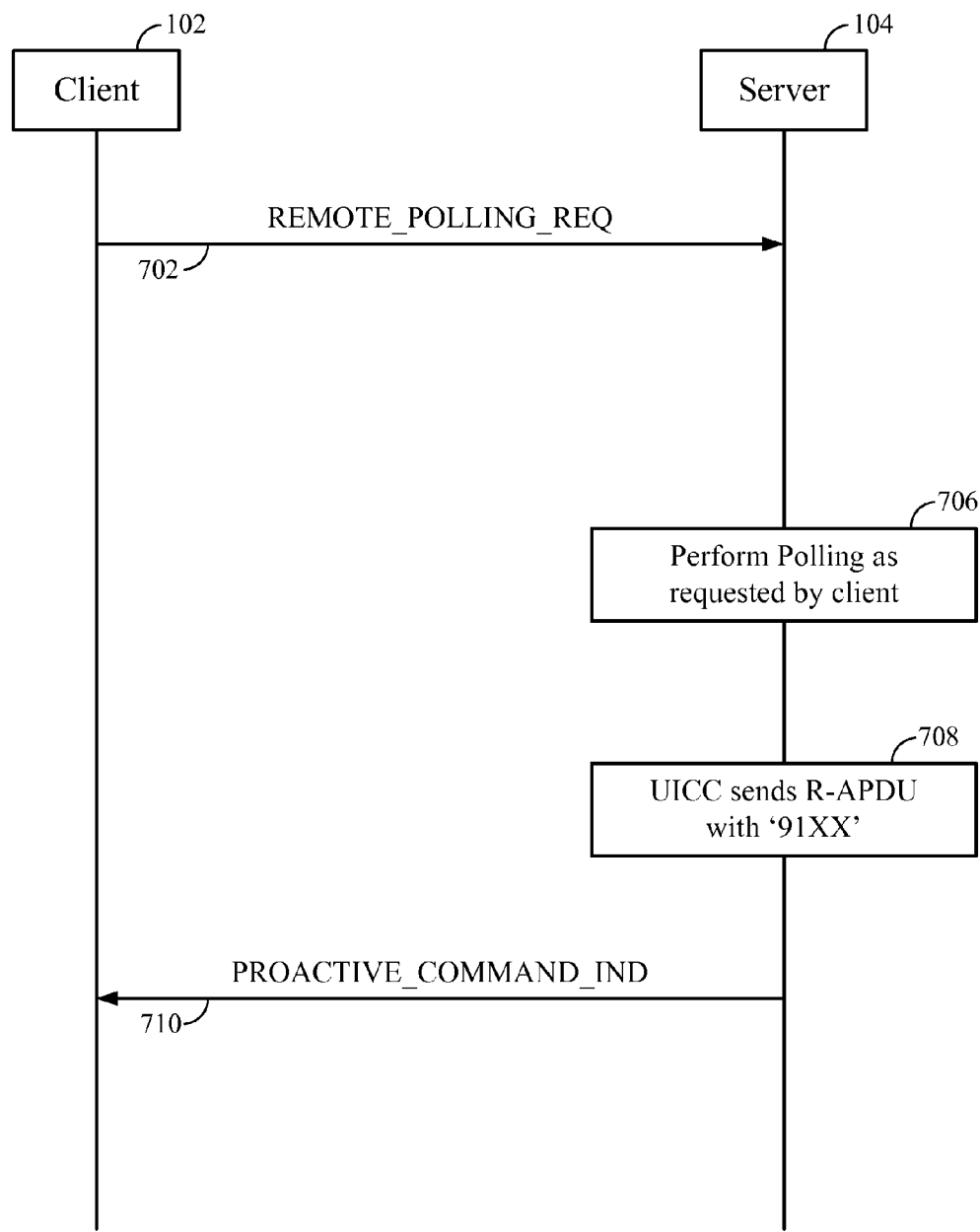
FIG. 7 is a signaling diagram for a client and server according to an embodiment using autonomous polling.

FIG. 7 is a signaling diagram illustrating an embodiment that allows a client to instruct a server to perform autonomous polling of an integrated circuit card, such as an UICC according to the technical specification ETSI TS 102 221. In the action 702, the client 102 sends to the server 104 a message denoted REMOTE_POLLING_REQ to request that the server 104 performs autonomous polling of an UICC, and passes parameters needed for this action (for example, polling interval or expected returned data). In the action 706, the server 104 performs polling of the UICC. The action 708 indicates that the SIM card has proactive data to send to the client 102, so that the SIM card sends a R-APDU to the server 104 with a status word '91XX' indicating a pending proactive command, where 'XX' is the length of the command. In the action 710, the server 104 sends to the client 102 the message PROACTIVE_COMMAND_IND containing the proactive data so that the client can proceed with a normal sequence to fetch and then execute it.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for improvements of the SAP protocol. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
    sending a first message by a client to a server,
    the first message comprising a first APDU (Application Protocol Data Unit) to request data from an integrated circuit card on the server, the data having a length;
    forwarding by the server the first APDU to the integrated circuit card;
    receiving at the server a first response from the integrated circuit card as a response to the first APDU,
    the first response indicating a procedure and the length of the data, the procedure indicating that a second APDU be sent to request the data, the second APDU comprising a parameter indicating the data length;
    generating, by the server, the second APDU subsequent to receiving the first response and sending the second APDU to the integrated circuit card to obtain the data;
    receiving at the server a second response from the integrated circuit card as a response to the second APDU, the second response comprising the data; and
    sending, by the server, a second message to the client comprising the data,
    wherein the first message does not include the second APDU.

2. The method of claim 1, where the integrated circuit card is selected from the group consisting of a Subscriber Identity Module (SIM) card, a UICC (Universal Integrated Circuit Card), and a smart card.

3. The method of claim 1, wherein the server does not send the first response to the client.

4. The method of claim 1, wherein the data comprises subscriber and network information for a radio access network.

5. The method of claim 1, further comprising:
    sending by the client to a radio access network the data received from the server.

6. The method of claim 1, wherein the client is selected from the group consisting of a car kit and a cell phone.

7. The method of claim 1, wherein the server is selected from the group consisting of a portable device and a wearable device.

8. The method of claim 1, wherein the first and second messages are sent over a Bluetooth link.

9. The method of claim 1, wherein the first APDU and the second APDU are compatible with the standard ISO/IEC 7816-4.

10. A method comprising:
    sending by a client to a server a first message comprising a plurality of command APDUs (Application Protocol Data Units) for processing by an integrated circuit card on the server,
    the first message indicating an order of processing for the plurality of command APDUs;
    storing at the server the plurality of command APDUs in a memory;
    sending by the server to the integrated circuit card a first command APDU in the plurality of command APDUs, the first command APDU to be processed first according to the order of processing;
    receiving at the server from the integrated circuit card a first response APDU in response to the first command APDU; and
    sending by the server to the client a second message indicating the first response APDU, wherein the client sends the first message in its entirety to the server before the server sends any message to the client in response to any of the plurality of command APDUs in the first message, and
    wherein the server sends the second message to the client before the server further communicates with the integrated circuit card.

11. The method of claim 10, the first message indicating actions to be taken by the server according to one or more status words provided by the integrated circuit card in response to receiving one or more command APDUs in the plurality of command APDUs.

12. The method of claim 10, the first response APDU comprising data requested by the first message, the second message comprising the data.

13. The method of claim 10, further comprising: sending by the server to the integrated circuit card a second command APDU in the plurality of command APDUs provided the first response APDU indicates no error, the second command APDU to be processed second according to the order of processing.

14. The method of claim 10, provided the first message indicates that the server is to stop sending to the integrated circuit card command APDUs from the plurality of command APDUs upon receiving one or more status words from the integrated circuit card indicating an error, the method further comprising:
    not sending by the server to the integrated circuit card all remaining command APDUs in the plurality of command APDUs that have not been sent to the integrated circuit card upon receiving the one or more status words; and
    sending by the server to the client one or more messages indicating that the remaining command APDUs have not been executed.

15. The method of claim 10, provided the first message indicates that the server is to jump in the order of processing upon receiving one or more status words from the integrated circuit card indicating an error, where the first message includes a parameter indicating the jump in the order of processing, the method further comprising:
    not sending by the server to the integrated circuit card a next in order command APDU in the plurality of command APDUs that is next in order according to the order of processing;
    sending by the server to the client a third message indicating that the next in order command APDU has not been executed; and
    sending by the server to the integrated circuit card a command APDU in the plurality of command APDUs indicated by the parameter.

16. The method of claim 10, where the integrated circuit card is selected from the group consisting of a Subscriber Identity Module (SIM) card, a UICC (Universal Integrated Circuit Card), and a smart card.

17. The method of claim 10, wherein the first message requests data from the integrated circuit card, the data comprising subscriber and network information for a radio access network.

18. The method of claim 10, further comprising:
sending by the client to a radio access network data received from the server.

19. The method of claim 10, wherein the client is selected from the group consisting of a car kit and a cell phone.

20. The method of claim 10, wherein the server is selected from the group consisting of a portable device and a wearable device.

21. The method of claim 10, wherein the first and second messages are sent over a Bluetooth link.

22. The method of claim 10, wherein the first command APDU in the plurality of command APDUs is compatible with the standard ISO/IEC 7816-4.

23. A method comprising:
sending by a client to a server a first message,
the server comprising an integrated circuit card, the first message indicating the server to perform autonomous polling of the integrated circuit card;
polling by the server the integrated circuit card in response to the first message;
in response to the polling by the server, the integrated circuit card sending to the server a command response APDU (Application Protocol Data Unit),
the response APDU comprising proactive data; and
sending by the server to the client a second message comprising the proactive data,
wherein the proactive data indicates a command to be executed by the client.

24. The method of claim 23, where the integrated circuit card is selected from the group consisting of a Subscriber Identity Module (SIM) card, a UICC (Universal Integrated Circuit Card), and a smart card.

25. The method of claim 23, wherein the client is selected from the group consisting of a car kit and a cell phone.

26. The method of claim 23, wherein the server is selected from the group consisting of a portable device and a wearable device.

27. The method of claim 23, wherein the first and second messages are sent over a Bluetooth link.

28. The method of claim 23, wherein the response APDU is compatible with the standard ISO/IEC 7816-4.

29. A server comprising:
an integrated circuit card storing data; and
a processor in communication with the integrated circuit card,
wherein the processor is configured to
receive a first message from a client,
the first message comprising a first APDU (Application Protocol Data Unit) to request data from the integrated circuit card, the data having a length,
forward the first APDU to the integrated circuit card,
receive a first response from the integrated circuit card as a response to the first APDU,
the first response indicating a procedure and the length of the data, the procedure indicating that a second APDU be sent to request the data, the second APDU comprising a parameter indicating the data length,
generate the second APDU subsequent to receiving the first response and send the second APDU to the integrated circuit card to obtain the data,
receive a second response from the integrated circuit card as a response to the second APDU, the second response comprising the data, and
send a second message to the client comprising the data,
wherein the first message does not include the second APDU.

30. The server of claim 29, where wherein the integrated circuit card is selected from the group consisting of a Subscriber Identity Module (SIM) card, a UICC (Universal Integrated Circuit Card), and a smart card.

31. The server of claim 29, wherein the processor does not send the first response to the client.

32. A server comprising:
an integrated circuit card to process APDUs (Application Protocol Data Units);
a memory; and
a processor in communication with the integrated circuit card,
wherein the processor is configured to
receive from a client a first message comprising a plurality of command APDUs for processing by the integrated circuit card,
the first message indicating an order of processing for the plurality of command APDUs, where the processor stores the plurality of command APDUs in the memory,
send to the integrated circuit card a first command APDU in the plurality of command APDUs,
the first command APDU to be processed first according to the order of processing,
receive from the integrated circuit card a first response APDU in response to the first command APDU, and
send to the client a second message indicating the first response APDU, and
wherein the processor is configured to receive the first message in its entirety before it sends any message to the client in response to any of the plurality of command APDUs in the first message, and
wherein the processor is configured to send the second message to the client before the processor further communicates with the integrated circuit card.

33. The server of claim 32, the first message indicating actions to be taken by the server according to one or more status words provided by the integrated circuit card in response to receiving one or more command APDUs in the plurality of command APDUs.

34. The server claim 32, the first response APDU comprising data requested by the first message, the second message comprising the data.

35. The server of claim 32, further comprising:
wherein the processor is further configured to send to the integrated circuit card a second command APDU in the plurality of command APDUs provided the first response APDU indicates no error, the second command APDU to be processed second according to the order of processing.

36. The server of claim 32, wherein provided the first message indicates that the server is to stop sending to the integrated circuit card command APDUs from the plurality of command APDUs upon receiving one or more status words from the integrated circuit card indicating an error, the processor is further configured to:
not send to the integrated circuit card all remaining command APDUs in the plurality of command APDUs that have not been sent to the integrated circuit card upon receiving the one or more status words; and send to the client one or more messages indicating that the remaining command APDUs have not been executed.

37. The server of claim 32, wherein provided the first message indicates that the server is to jump in the order of processing upon receiving one or more status words from the integrated circuit card indicating an error, where the first message includes a parameter indicating the jump in the order of processing, the processor is further configured to:
   not send to the integrated circuit card a next in order command APDU in the plurality of command APDUs that is next in order according to the order of processing;
   send to the client a third message indicating that the next in order command APDU has not been executed; and
   send to the integrated circuit card a command APDU in the plurality of command APDUs indicated by the parameter.

38. A server comprising:
an integrated circuit card; and
a processor in communication with the integrated circuit card,
wherein the processor is configured to receive from a client a first message,
the first message indicating the server to perform autonomous polling of the integrated circuit card,
wherein in response to receiving the first message,
the processor is configured to poll the integrated circuit card; and
wherein in response to the polling by the processor, the integrated circuit card is configured to send to the processor a response APDU (Application Protocol Data Unit) comprising proactive data,
wherein the processor is configured to send to the client a second message comprising the proactive data, and
wherein the proactive data indicates a command to be executed by the client.

39. A server comprising:
means for receiving a first message from a client,
the first message comprising a first APDU (Application Protocol Data Unit) to request data from
an integrated circuit card on the server, the data having a length;
means for forwarding the first APDU to the integrated circuit card;
means for receiving a first response from the integrated circuit card as a response to the first APDU, the first response a procedure and the length of the data, the procedure indicating that a second APDU be sent to request the data, the second APDU comprising a parameter indicating the data length;

means for generating the second APDU subsequent to receiving the first response and means for sending the second APDU to the integrated circuit card to obtain the data;
means for receiving a second response from the integrated circuit card as a response to the second APDU, the second response comprising the data; and
means for sending a second message to the client comprising the data,
wherein the first message does not include the second APDU.

40. A server comprising:
means for receiving from a client a first message comprising a plurality of command APDUs (Application Protocol Data Units) for processing by an integrated circuit card on the server, the first message indicating an order of processing for the plurality of command APDUs;
means for storing the plurality of command APDUs in a memory;
means for sending to the integrated circuit card a first command APDU in the plurality of command APDUs, the first command APDU to be processed first according to the order of processing;
means for receiving from the integrated circuit card a first response APDU in response to the first command APDU; and
means for sending to the client a second message indicating the first response APDU,
wherein the means for receiving receives the first message in its entirety before the means for sending sends any message to the client in response to any of the command APDUs in the first message, and
wherein the means for sending the second message sends the second message to the client before the means for sending to the integrated circuit card further communicates with the integrated circuit card.

41. A server comprising:
an integrated circuit card;
means for receiving from a client a first message indicating the server to perform autonomous polling of the integrated circuit card;
means for polling the integrated circuit card in response to the first message,
wherein in response to the polling by the means for polling, the integrated circuit card sending sends to the server a command response APDU (Application Protocol Data Unit) comprising proactive data; and
means for sending to the client a second message comprising the proactive data,
wherein the proactive data indicates a command to be executed by the client.

* * * * *